United States Patent [19]
Goldman

[11] 4,307,145
[45] Dec. 22, 1981

[54] DECORATIVE FABRIC AND METHOD OF MAKING THE SAME

[76] Inventor: Daniel S. Goldman, c/o TSG Incorporated, Two Bala Cynwyd Plaza, Bala Cynwyd, Pa. 19004

[21] Appl. No.: 233,340

[22] Filed: Feb. 11, 1981

[51] Int. Cl.³ .............................................. B32B 7/00
[52] U.S. Cl. .................................. 428/247; 156/148; 428/234; 428/252; 428/253; 428/280; 428/282; 428/284; 428/287; 428/293; 428/294; 428/300; 428/303; 428/343; 428/354; 428/316.6
[58] Field of Search .............. 156/148; 428/192, 233, 428/234, 235, 247, 252, 253, 255, 284, 287, 294, 295, 300, 343, 354, 280, 282, 310, 293; 28/105, 107, 109

[56] References Cited

U.S. PATENT DOCUMENTS

| | | | |
|---|---|---|---|
| 3,097,413 | 7/1963 | Draper, Jr. | 34/95 |
| 3,216,082 | 11/1965 | Goy | 28/110 |
| 3,287,786 | 11/1966 | Goy | 28/107 |
| 3,440,113 | 4/1969 | Wolley | 148/187 |
| 3,538,564 | 11/1970 | Skoler et al. | 28/109 |
| 3,565,741 | 2/1971 | Jaray | 428/294 |
| 3,598,689 | 8/1971 | Feffer et al. | 418/294 |
| 3,867,245 | 2/1975 | Hormom | 428/294 |
| 4,110,505 | 8/1978 | Preivo | 428/294 |
| 4,188,445 | 2/1980 | Hill | 428/246 |
| 4,197,343 | 4/1980 | Forsythe | 428/234 |
| 4,199,640 | 4/1980 | Goldman | 428/192 |

*Primary Examiner*—James J. Bell
*Attorney, Agent, or Firm*—Zachary T. Wobensmith, 2nd; Zachary T. Wobensmith, III

[57] ABSTRACT

Decorative fabrics and methods of making the same are disclosed the fabrics, depending upon their constituents serving a wide range of uses, including wall coverings, floor coverings, upholstery fabrics and fabrics useful for other purposes. The fabrics have an exposed decorative face, preferably composed of parallel longitudinal yarns, which are brought together onto a supporting web and then passed through a needle loom so that fibers from the face extend through and are exposed on the back. Various provisions may be made to achieve the integrity of the decorative fabric including the application onto the back of the supporting web of a bonding coating, or application by an adhesive of a backing of paper or other type web, and additionally, if desired, of a felt or other backing including a resilient or sound absorbing backing. The supporting web can be a woven or knitted fabric, a non-woven fabric, an open mesh fabric such as a netting, or any other desired material capable of being passed through a needle loom to retain the face yarns in a dimensionally stable fabric. Methods of making the fabrics are also described.

31 Claims, 3 Drawing Figures

DECORATIVE FABRIC AND METHOD OF MAKING THE SAME

BACKGROUND OF THE INVENTION

1. Field of the Invention

This invention relates to decorative fabrics and methods of making the same.

2. Background of the Prior Art

It has heretofore been proposed to laminate a plurality of layers of yarns or the like which are held together by adhesives. Examples include Burnett, U.S. Pat. No. 3,440,113, and Hill, U.S. Pat. No. 4,188,445.

It has also been proposed as shown in U.S. Patent to Skoler et al., U.S. Pat. No. 3,538,564; U.S. Patent to Goy, U.S. Pat. No. 3,287,786; U.S. Patent to Goy, U.S. Pat. no. 3,216,082; and U.S. Patent to Draper, U.S. Pat. No. 3,097,413 to employ needle looms to secure together a plurality of laminations. None of the foregoing undertake to provide decorative fabrics as herein described.

In my prior U.S. Pat. No. 4,199,640 there is disclosed a decorative fabric formed on a needle loom which comprises a layer of longitudinal face yarns with fibers extending through to the back bonded by a retaining coating applied to the back but there may be a tendency of the yarns to separate or be separable from the retaining coating and the fabric lacks sufficient dimensional stability in the transverse direction.

SUMMARY OF THE INVENTION

In accordance with the invention decorative fabrics and methods of making the same are provided having a wide range of usefulness including wall coverings, floor coverings, upholstery fabrics and fabrics useful for other purposes. The fabrics have exposed decorative faces of a plurality of parallel yarns in edge to edge contact which are brought together on a supporting web which may be a woven or knitted fabric, a non-woven fabric, an open mesh fabric such as netting, or any other fabric capable of being passed through a needle loom, the yarns and web being passed through a needle loom so that fibers from the face extend through to and are exposed on the back, the fibers and supporting web can be secured or bonded by the application onto the back of a bonding coating, or application by an adhesive of a backing of paper or other type of web, and additionally, if desired, of a felt or other backing including a resilient or sound absorbing backing.

It is the principal object of the invention to provide decorative fabrics having a wide range of uses which may be quickly and inexpensively constructed.

It is a further object of the invention to provide decorative fabrics having a wide range of uses including wall coverings, floor coverings, upholstery fabrics and fabrics useful for other purposes.

It is a further object of the invention to provide simple but effective methods for making decorative fabrics as aforesaid.

Other objects and advantageous features of the invention will be apparent from the description and claims.

BRIEF DESCRIPTION OF THE DRAWINGS

The nature and characteristic features of the invention will be more readily understood from the following description taken in connection with the accompanying drawings forming part hereof in which.

It should, of course, be understood that the description and drawings herein are illustrative merely and that various modifications and changes can be made in the structure disclosed without departing from the spirit of the invention.

Like numerals refer to like parts throughout the several views.

DESCRIPTION OF THE PREFERRED EMBODIMENTS

Figure 1:
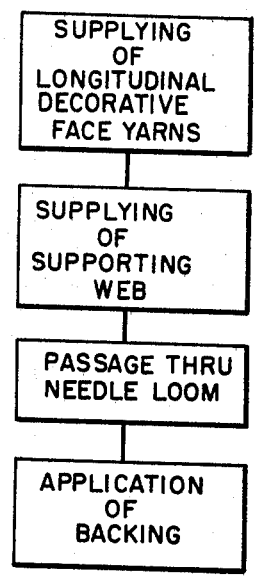
FIG. 1 is a diagrammatic view showing the steps in connection with the preparation of fabrics in accordance with the invention.

Referring first to FIG. 1 of the drawings the initial step is the advancing of the decorative face yarns in a plane and in a longitudinal direction. The face yarns are of the decorative type, natural or synthetic, as desired, can be bulky, thick and/or thin, slub, novelty or boucles, as desired, are preferably plied yarns from spun or single strands, or bulked continuous filament yarns known as textured yarns and can be of any desired color or assortment of colors.

If bulky yarns are employed they may be arranged 4 to 7 to the inch, if medium yarns are employed they may be 8 to 15 to the inch, and if fine yarns are employed they may be 16 to 30 to the inch, and accordingly can range from 100 yards to the pound to 2000 yards to the pound.

The longitudinal decorative face yarns are preferably advanced as close together as possible without overcrowding in the same plane, and touching at their side margins.

The supporting web, preferably supplied from any desired source in continuous length is advanced in such a manner as to be adjacent to the face yarns and so that the needles of the needle loom initially contact the decorative face yarns. The supporting web can be of any suitable material capable of being passed through a needle loom with the face yarns.

One suitable material for the supporting web can be a spun-bonded polyester with straight or crimped fibers available under the trade name REEMAY from E. I. DuPont de Nemours & Co. Inc., Wilmington, Delaware. Straight fiber REEMAY is available in a range of weights from 1.5 to 5 oz. per square yard and crimp fiber REEMAY is available in a range from 2.2 to 6 oz. per square yard.

Another suitable material for the supporting web can be a spun bonded polypropylene available under the trade name TYPAR from E. I. DuPont de Nemours & Co., Inc., Wilmington, Delaware.

Other spun bonded, air laid or carded filbers in web form of nylon, polypropylene, polyethylene or polyester fibers can also be employed in suitable weight ranges.

Another suitable material for the supporting web can be a knitted or woven scrim or muslin having a weight in the range from 2 to 16 oz. per square yard.

Another suitable material for the supporting web can be an open mesh fabric such as netting, one such netting of synthetic plastic material, being available fron Conwed Corporation, Plastics Division, of Minneapolis, Minnesota, with a strand count of 4×4 to the inch and a weight of 5 pounds per 1000 square feet. Other open mesh fabrics can be employed.

The longitudinal face yarns in flat condition and in face to face relation to the supporting web, also in flat condition are passed through a needle loom so that the needles initially contact the decorative face yarns. A needle density in the range from 90 to 117 per inch is suitable. A 90 density board, i.e. one having 90 needles to the inch on a width of 11⅝ inches has been found satisfactory.

The needles are preferably those known as gentle needles, are directional and pull out clean, the thickness of the yarn determining to at least some extent the relative harshness of the needles. In the advance through the needle loom the penetrations per square inch of the yarn are in the range of 200 to 700 penetrations per inch, a range of 300 to 400 being preferred. The thickness of the yarns will also determine the depth of penetration which preferably is in the range from one quarter to three quarters of an inch. The action of the needle loom is to unite the face yarns at their edges without any considerable change in the appearance of the face yarns, and with transfer of fibers through the supporting web and away from the exposed decorative face.

Immediately subsequent to the needling operation a bonding coating is applied to the back of the supporting web, and is dried. The bonding coating may be of latex emulsions, solvent solutions, aqueous or solvent dispersions, hot melt or other suitable binders. The bonding coating can be applied as a spray, with a roller or knife, or in any desired manner, and may be colored to conform substantially to the color of the face yarns, or may be of a contrasting or modified color. The fabric as heretofore described can be made at a rate of the order of four to six yards per minute.

Figure 2:
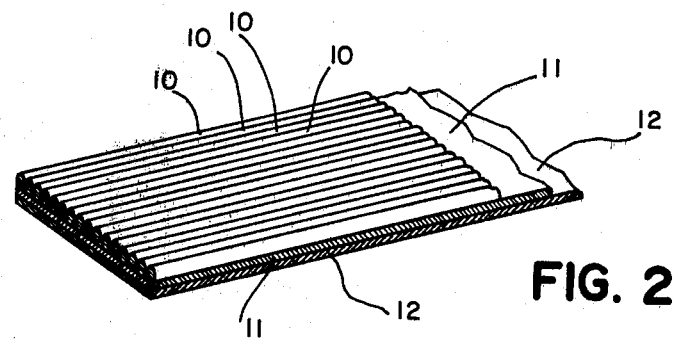
FIG. 2 is a view in perspective of fabrics made in accordance with the invention, layers being broken away to show the details of construction.

Referring now to FIG. 2, a piece of the fabric heretofore described is there shown with longitudinal decorative face yarns 10, supporting web 11 and bonding back coating 12.

The fabric produced as herein described consists essentially of decorative longitudinal or warp yarns on and secured to a supporting web and having a bonding coating on the back of the fabric, with the longitudinal yarns providing the exposed decorative surface, which is strong in the machine and transverse direction, is suitable for application to supporting structures, which has an attractive appearance, which can be made rapidly at low cost and which is suitable for a variety of uses, including adherent attachment to decorative wall panels.

In the fabric of FIG. 2 the supporting web 12 can also be a composite fabric composed of a woven or a nonwoven web affixed to felt, or batting, and to serve as an insulating, cushioning or sound absorbing fabric.

Figure 3:
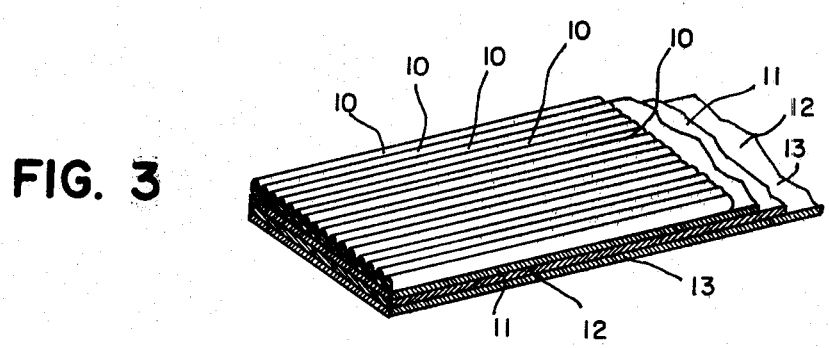
FIG. 3 is a view in perspective of other fabrics made in accordance with the invention, layers being broken away to show the details of construction.

In FIG. 3, a modified form of fabric is shown in which, for use as a wall covering, an additional backing sheet 13, of paper or other sheet material may be employed, in adhesive or adherent engagement with the bonding coating 12.

If the fabric of FIG. 3 is to be used for a floor covering, a backing sheet 13 of felt or of other cushioning material to serve as a secondary backing, such as plastic foam, may be applied in adhesive or adherent engagement with the bonding coating 12.

I claim:

1. A decorative fabric comprising
longitudinal decorative face yarns in a flat side by side continuous disposition providing the exposed decorative face of the fabric,
a supporting web in engagement with the face opposite the exposed decorative face,
said face yarns having fibers thereof disposed therethrough and through the supporting web, and
means on the exposed face of the supporting web and in engagement with the fibers exposed on the supporting web and retaining the integrity of the fabric.

2. A decorative fabric as defined in claim 1 in which the face yarns are in the range from 4 to 30 to the inch.

3. A decorative fabric as defined in claim 1 in which the face yarns are bulky and in the range from 4 to 8 to the inch.

4. A decorative fabric as defined in claim 1 in which the face yarns are of medium size and in the range from 16 to 30 to the inch.

5. A decorative fabric as defined in claim 1 in which the face yarns are relatively fine and in the range from 16 to 30 to the inch.

6. A decorative fabric as defined in claim 1 in which the supporting web is a fibrous web with fibers from the group consisting of nylon, polypropylene, polyethylene and polyester.

7. A decorative fabric as defined in claim 1 in which the supporting web is a knitted fabric.

8. A decorative fabric as defined in claim 1 in which the supporting web is a woven fabric.

9. A decorative fabric as defined in claim 1 in which the supporting web is an open mesh fabric.

10. A decorative fabric as defined in claim 1 in which the supporting web comprises an insulating web.

11. A decorative fabric as defined in claim 1 in which the supporting web comprises a cushioning web.

12. A decorative fabric as defined in claim 1 in which the supporting web comprises a sound absorbing web.

13. A decorative fabric as defined in claim 1 in which the surrounding web comprises a felt and a textile fabric affixed thereto.

14. A decorative fabric as defined in claim 1 in which the means for retaining the integrity of the fabric has sheet material in engagement therewith.

15. A decorative fabric as defined in claim 1 in which the means for retaining the integrity of the fabric has a secondary backing of cushioning material secured thereto.

16. A decorative fabric as defined in claim 1 in which the means for retaining the integrity of the fabric has a secondary backing of plastic foam secured thereto.

17. A decorative fabric as defined in claim 1 in which the means for retaining the integrity of the fabric has a secondary backing of felt secured thereto.

18. The method of making a decorative fabric which comprises
continuously advancing a flat sheet of longitudinally disposed decorative face yarns in side by side and edge contacting arrangement,
continuously advancing a supporting web into face to face contact with the flat sheet of face yarns,
passing the face yarns and the supporting web through a needle loom and applying the needles through the face yarns and simultaneously through the supporting web to the face opposite the faces in face to face contact, and applying a bonding material onto the said opposite face to retain the integrity of the fabric.

19. The method defined in claim 18 in which during the passage of the face yarns and the supporting web through the needle loom fibers from the face yarn and the supporting web are advanced to the said opposite face, and the bonding material is applied to said opposite face and to the fibers advanced thereto.

20. The method defined in claim 18 in which the supporting web is a fibrous web with fibers from the group consisting of nylon, polypropylene, polyethylene and polyester.

21. The method defined in claim 18 in which the supporting web comprises a felt and a textile fabric affixed thereto.

22. The method defined in claim 18 in which the supporting web is a knitted fabric.

23. The method defined in claim 18 in which the supporting web is a woven fabric.

24. The method defined in claim 18 in which the supporting web is an open mesh fabric.

25. The method defined in claim 18 in which the supporting web comprises an insulating web.

26. The method defined in claim 18 in which the supporting web comprises a cushioning web.

27. The method defined in claim 18 in which the supporting web comprises a sound absorbing web.

28. The method defined in claim 18 in which sheet material is applied to the backing material in engagement therewith.

29. The method defined in claim 18 in which a secondary backing of cushioning material is secured to the bonding material.

30. The method defined in claim 18 in which a secondary backing of plastic foam is applied to the bonding material in engagement therewith.

31. The method defined in claim 18 in which a secondary backing of felt is applied to the bonding material in engagement therewith.

* * * * *